United States Patent
Nakamura et al.

(10) Patent No.: US 6,776,491 B2
(45) Date of Patent: Aug. 17, 2004

(54) LIQUID CRYSTAL DISPLAY APPARATUS

(75) Inventors: Fusanobu Nakamura, Yamato (JP); Fumio Tamura, Yamato (JP); Yoshimasa Kiyotani, Hiratsuka (JP); Mitsuo Horiuchi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 09/682,771

(22) Filed: Oct. 17, 2001

(65) Prior Publication Data

US 2002/0063816 A1 May 30, 2002

(30) Foreign Application Priority Data

Oct. 17, 2000 (JP) ........................................ 2000-317134

(51) Int. Cl.⁷ .............................................. G03B 21/00
(52) U.S. Cl. ........................................ 353/31; 349/115
(58) Field of Search ............................. 353/31; 349/115

(56) References Cited

U.S. PATENT DOCUMENTS 6,394,607 B1 * 5/2002 Hashizume et al. .......... 353/31

FOREIGN PATENT DOCUMENTS

| JP | 6-83479 | 3/1994 | ............. G06F/1/16 |
| JP | 8-76882 | 3/1996 | ............. G06F/1/16 |

* cited by examiner

Primary Examiner—John F. Niebling
Assistant Examiner—Andre' C. Stevenson
(74) Attorney, Agent, or Firm—Derek S. Jennings; Anne V. Dougherty

(57) ABSTRACT

A display apparatus is characterized by having a display panel for displaying an image, a light source for supplying light to the display panel, and a flat-surface lighting surface member which has a lighting surface emitting light, radiated from the light source, as flat-surface light while being arranged with the display panel. A housing contains the display panel, the light source, and the flat-surface lighting surface member. The housing further includes a window through light passes the flat-surface lighting surface member and leaks to the outside.

7 Claims, 13 Drawing Sheets

[Figure 1]
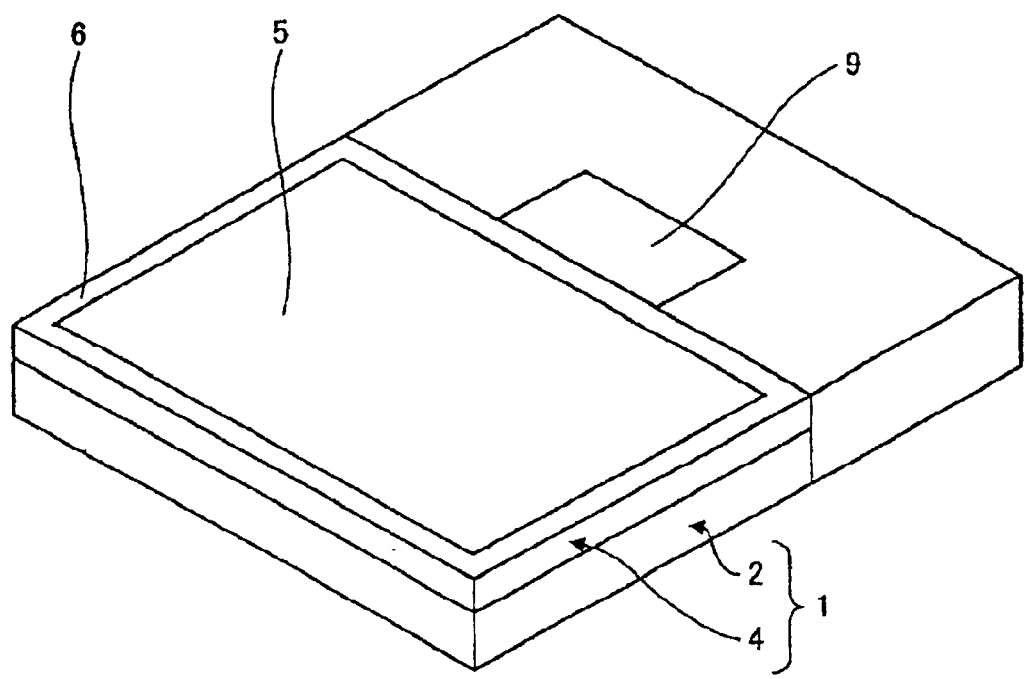

[Figure 2]
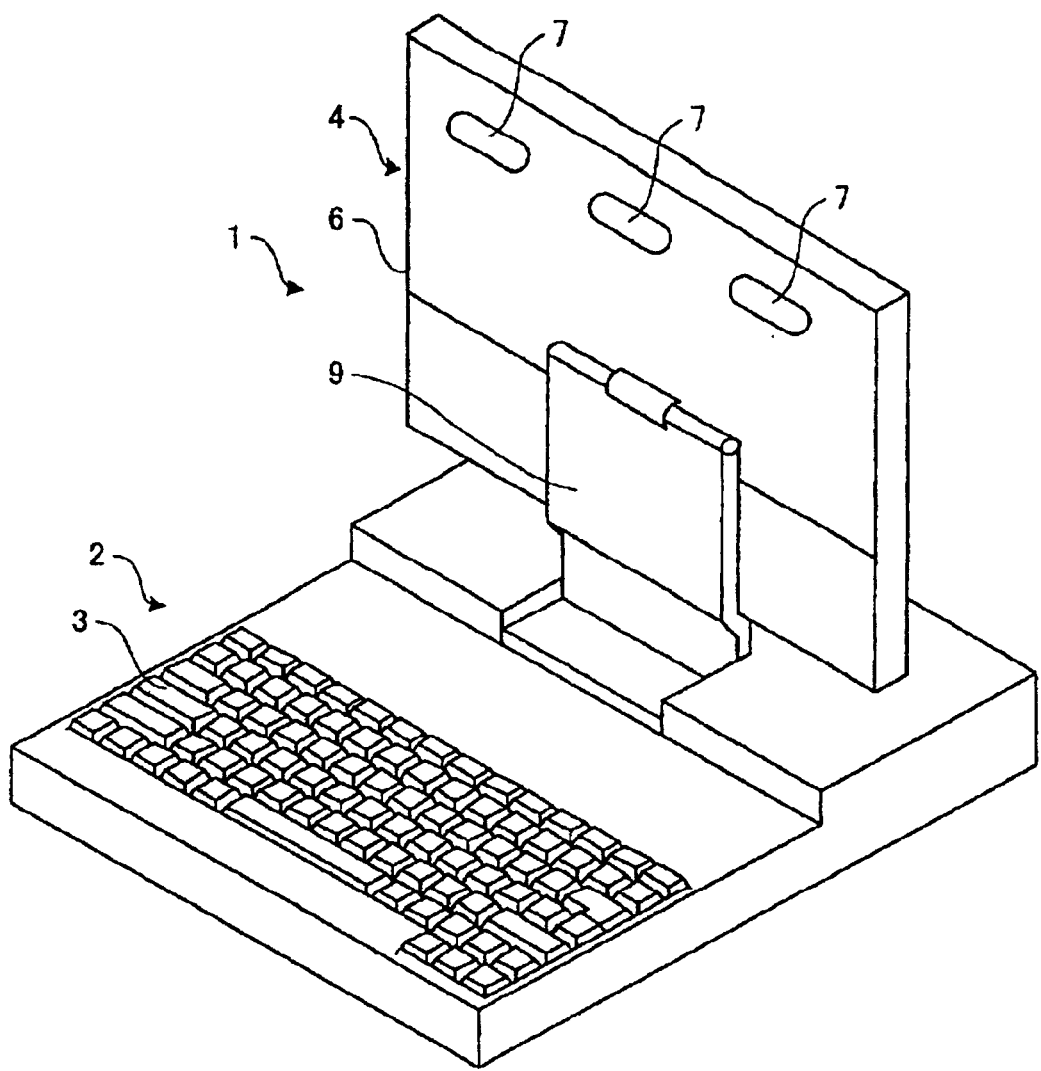

[Figure 3]
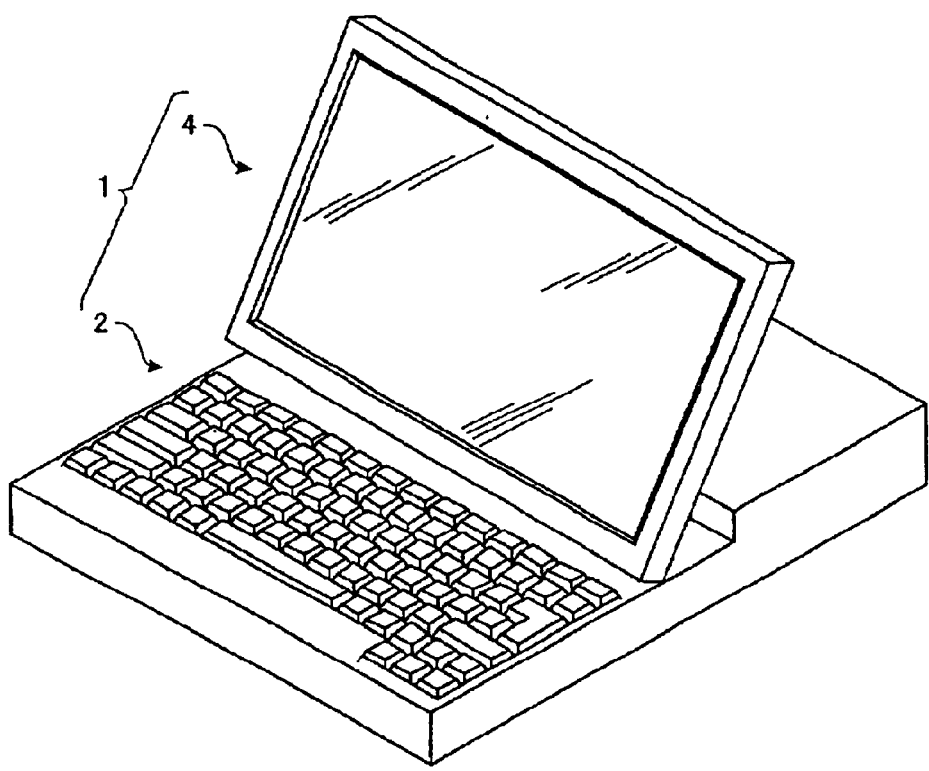

[Figure 4]
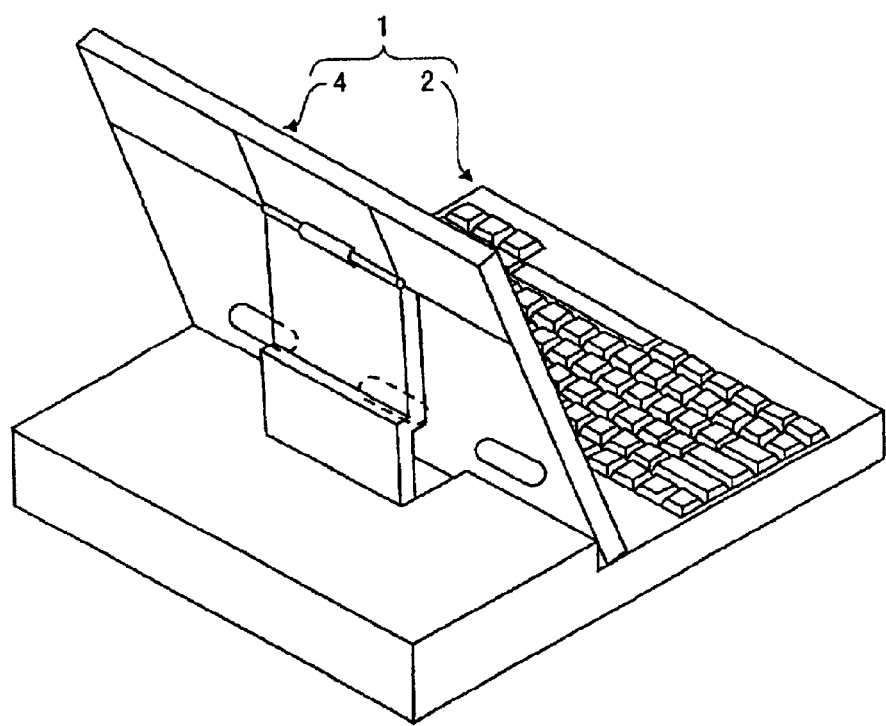

[Figure 5]
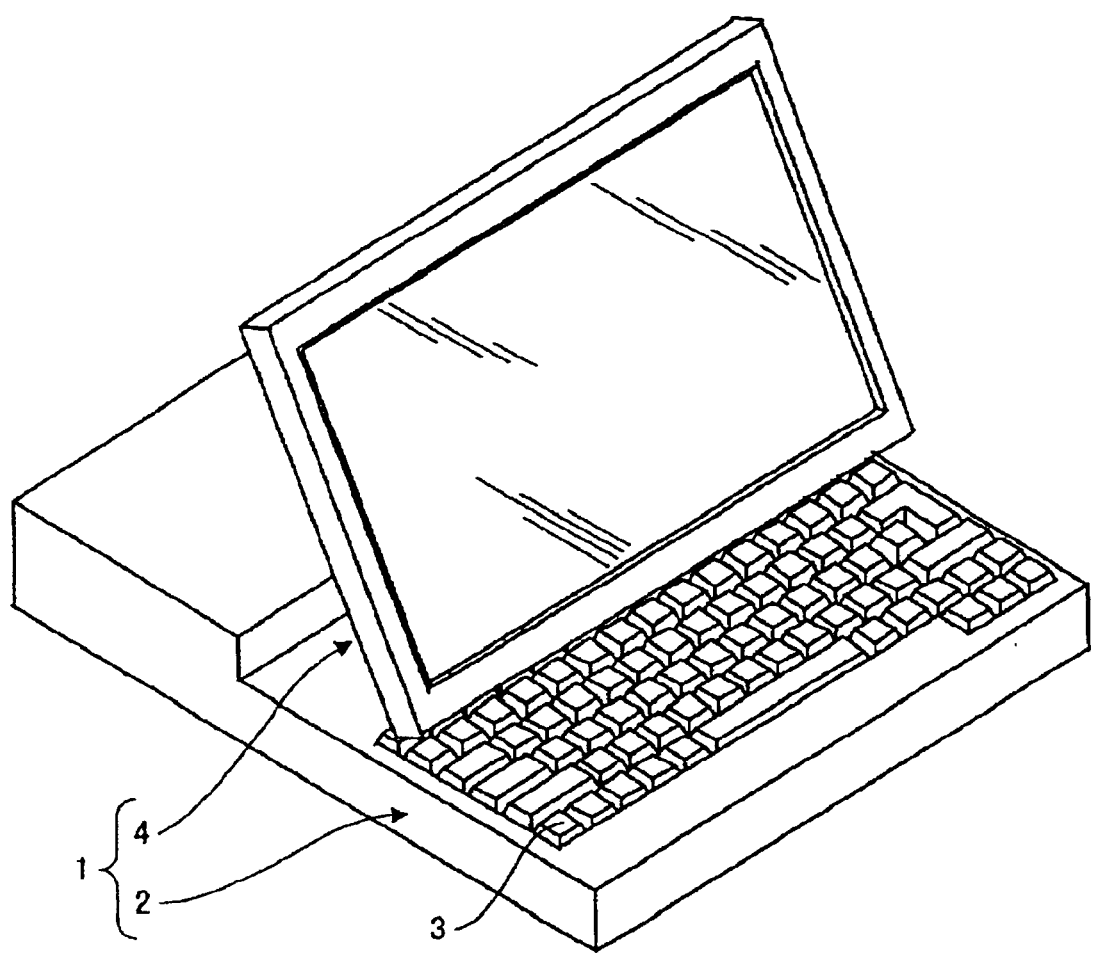

[Figure 6]
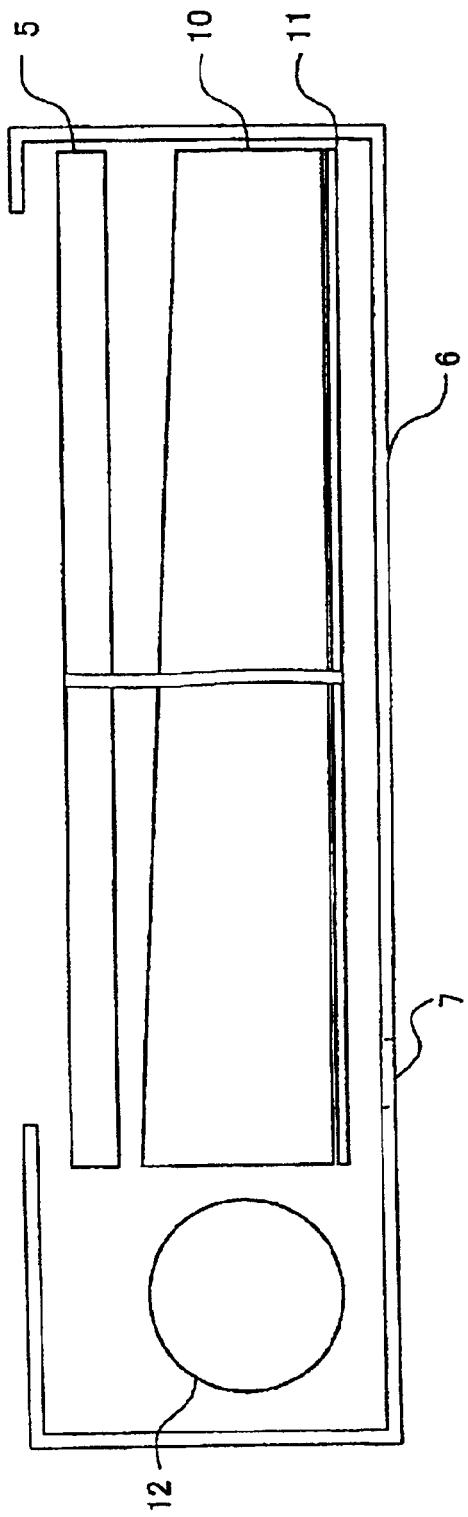

[Figure 7]
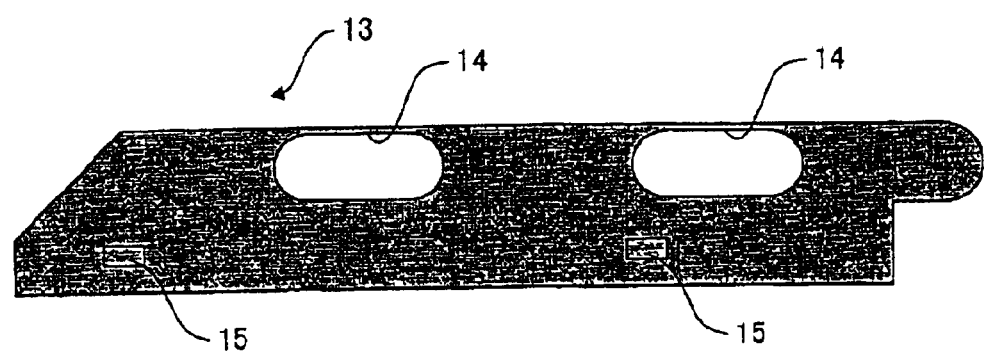

[Figure 8]
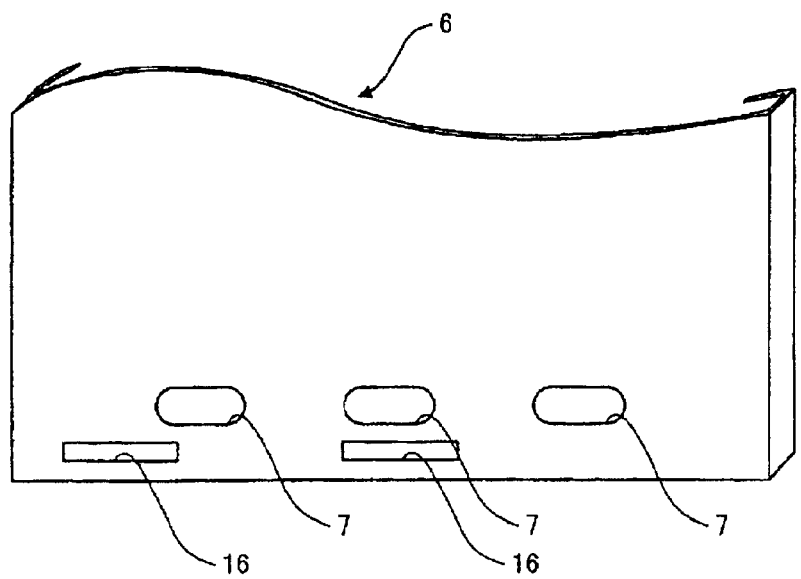

[Figure 9]
(a)
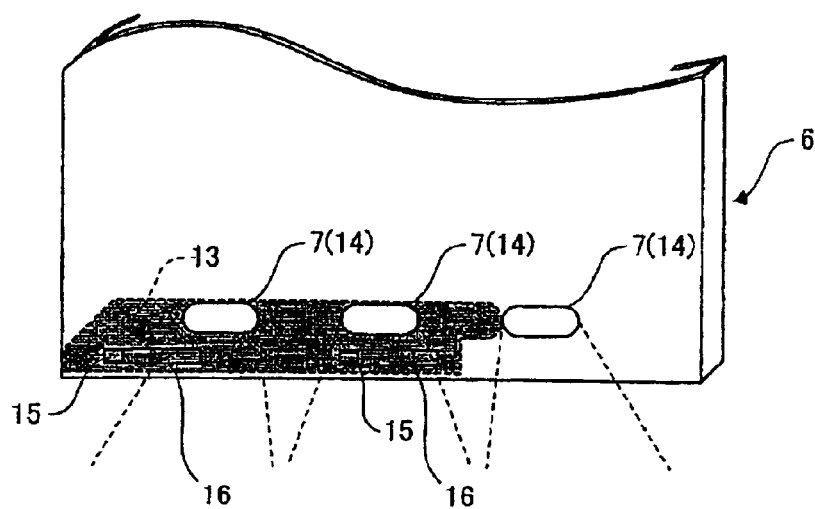
(b)
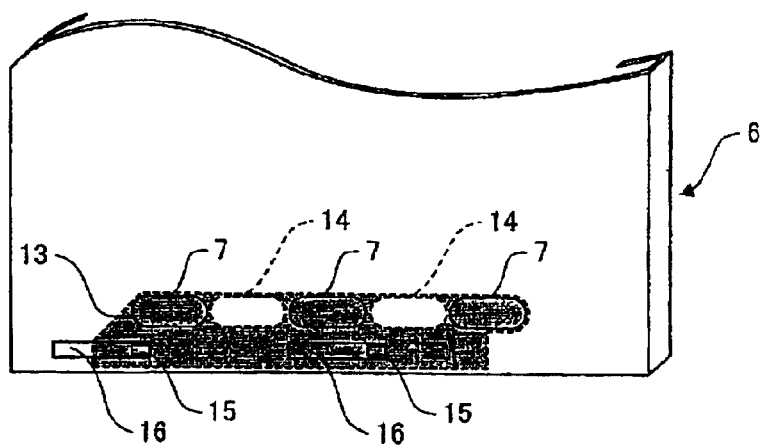

[Figure 10]
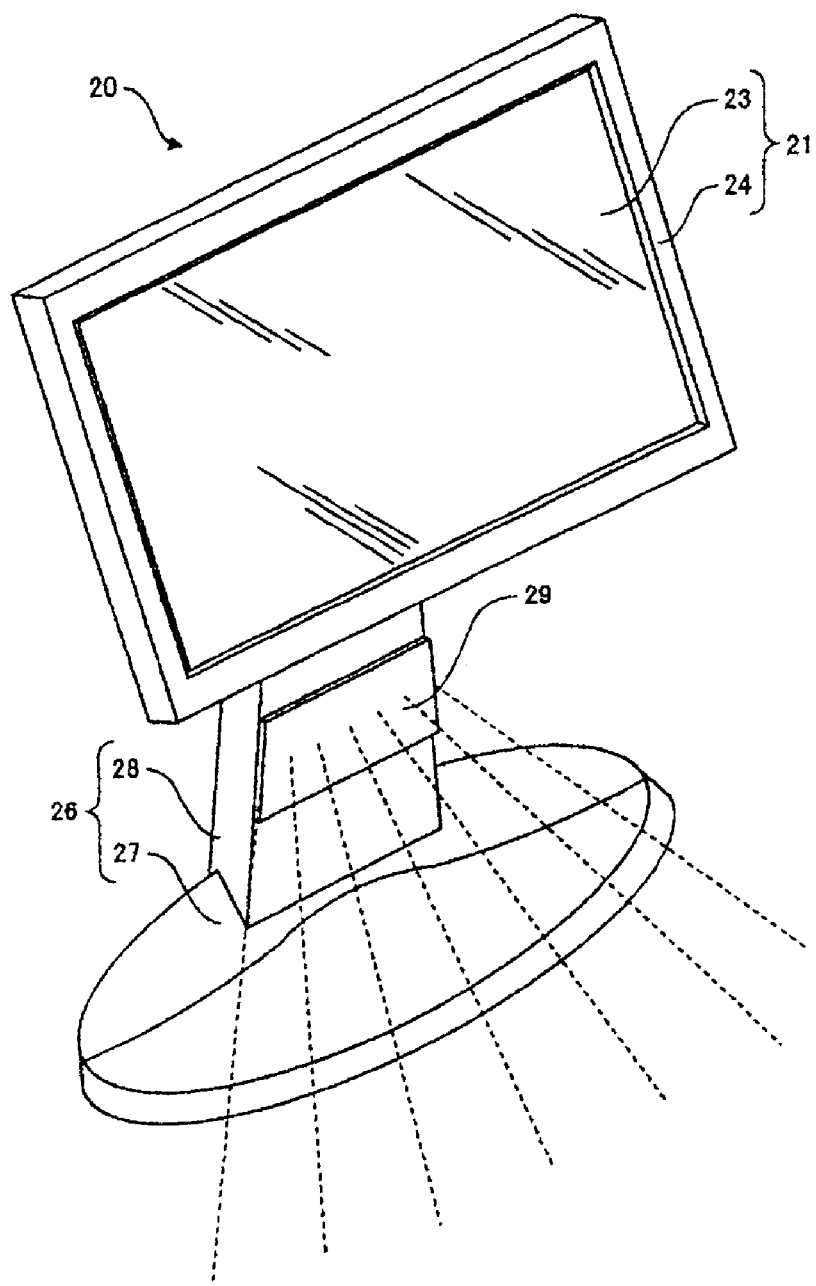

[Figure 11]
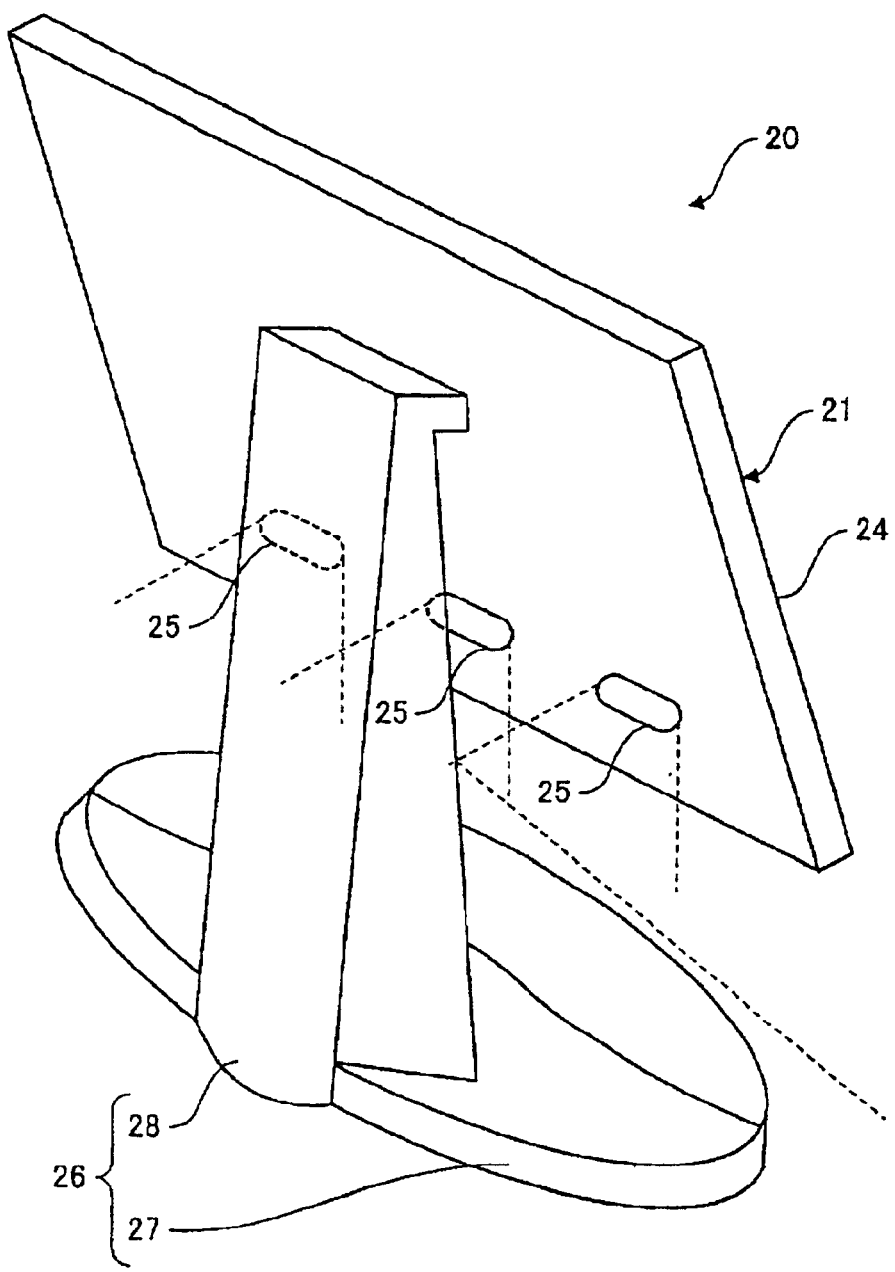

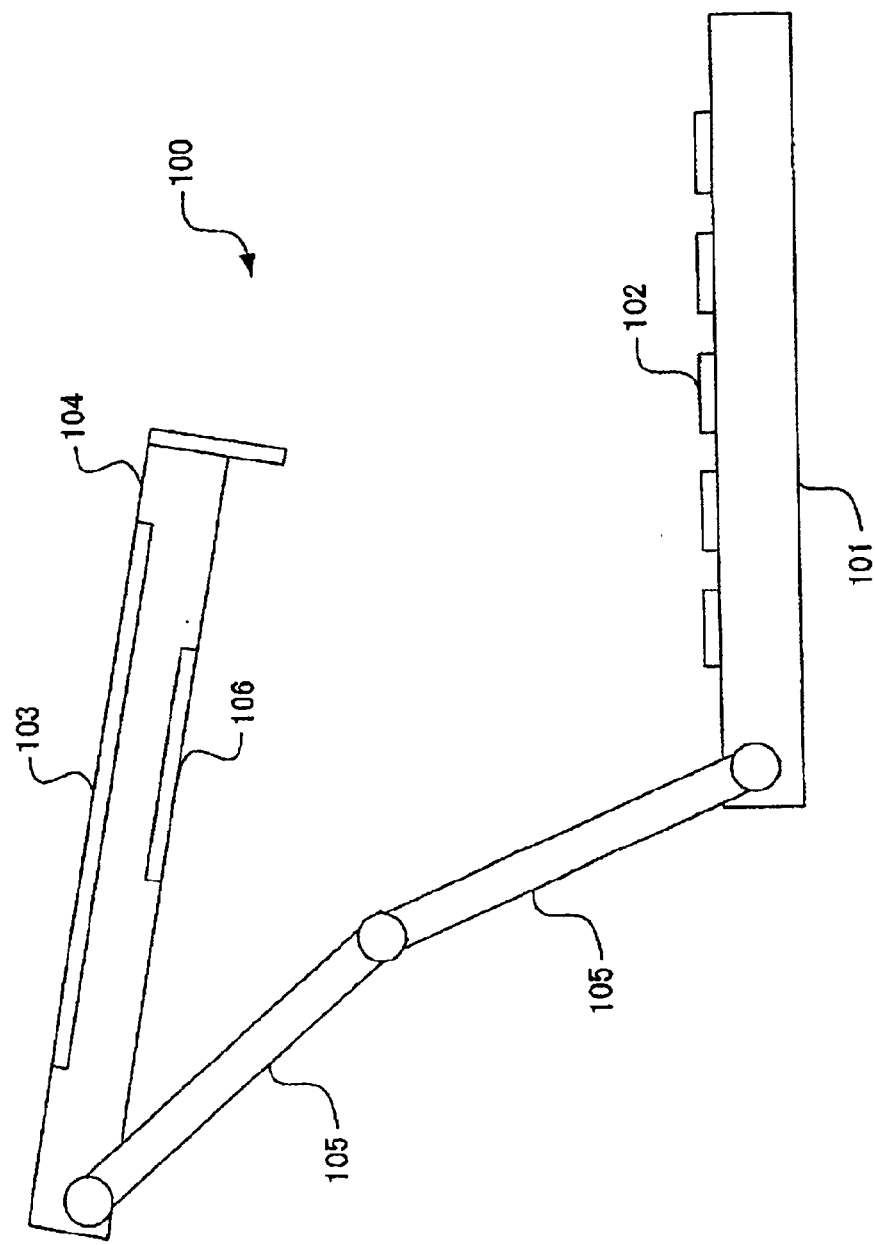
[Figure 12]

[Figure 13]
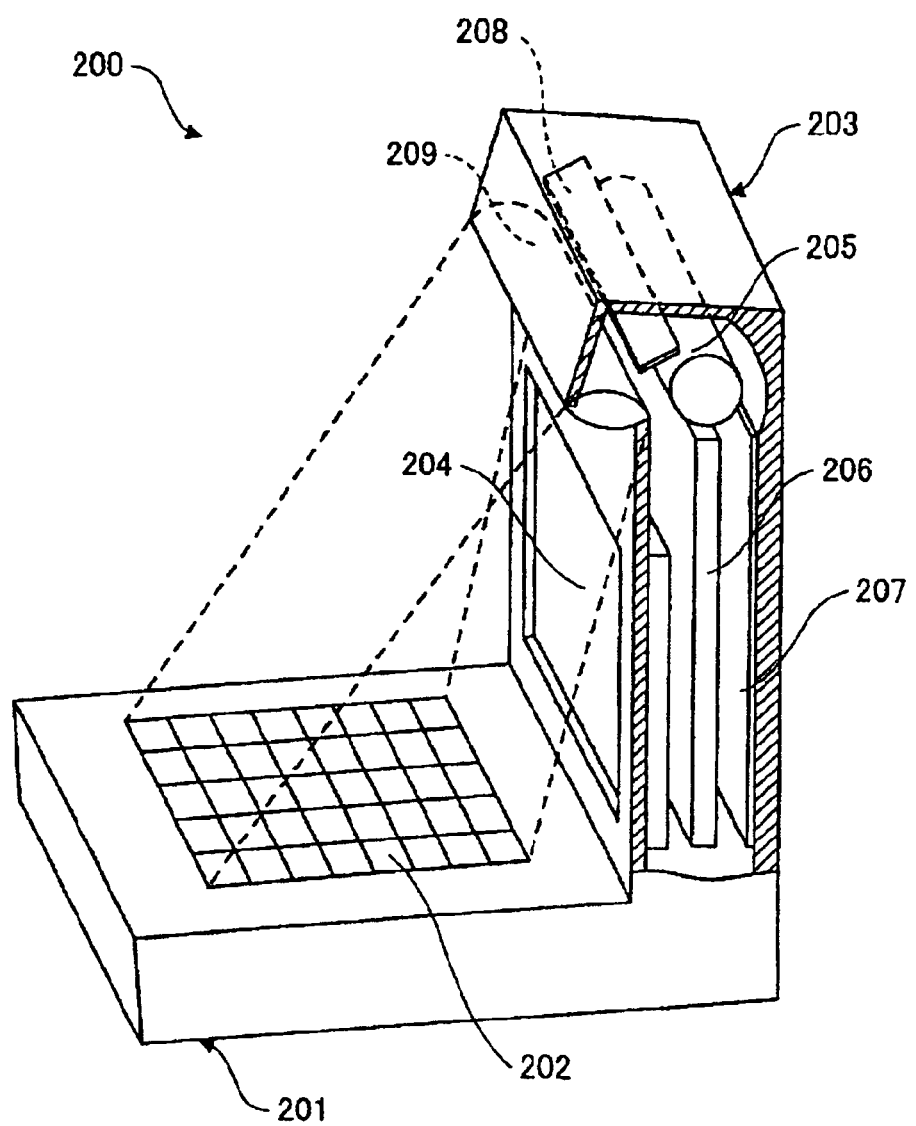

LIQUID CRYSTAL DISPLAY APPARATUS

BACKGROUND OF INVENTION

1. Field of the Invention

The present invention relates to an image display apparatus which is represented by a liquid crystal display apparatus, and electronic equipment equipped with an image display apparatus, and in particular, to a computer system.

2. Background Art

The diffusion of personal computers (hereafter, PC) is remarkable, and the activities in the office, which are performed without using PCs, now are no longer considered. In addition, there is also a case that both a desktop PC, installed in an office, and a notebook PC, excellent in portability, are used as PCs.

Since being excellent in portability, a notebook PC is frequently used in places other than an office. Since illumination is fully provided when the notebook PC is used in an office, it is possible to secure sufficient luminosity on a keyboard that is the input means of the notebook PC. However, sufficient luminosity may be unable to be secured when used in places other than an office. For example, it is the case that a notebook PC is used in an airplane. In the airplane that is performing a night flight, when people around are sleeping and an overhead lamp provided in the airplane is used, a trouble may happen for the people around. Therefore, assuming such a situation, it is desirable to equip the notebook PC with an illumination light that can illuminate a keyboard.

A computer that can meet this request is disclosed in Published Unexamined Japanese Patent Application Nos. 6-83479 and 8-76882.

A portable computer 100 disclosed in Published Unexamined Japanese Patent Application No. 6-83479 is shown in FIG. 12. This portable computer 100 comprises a keyboard unit 101 equipped with keys 102 in a top face, a display unit 104 equipped with a display screen 103 in a top face side, and support means 105 supporting the display unit 104 over the keyboard unit 101. The display unit 104 is arranged so that it can be seen from a top against the keyboard unit 101 with the support means 105 configured by a linkage or a support. A lamp 106 illuminating the keys 102 on the keyboard unit 101 is provided in an undersurface side of the display unit 104.

A portable computer 200 disclosed in Published Unexamined Japanese Patent Application No. 8-76882 is shown in FIG. 13. The portable computer 200 consists of an operation unit 201 equipped with a keyboard 202, and a display 203 equipped with a liquid crystal panel 204. A backlight unit consisting of a fluorescent lamp 205, a light guide plate 206, and a passive reflector 207 is provided in a back surface of the liquid crystal panel 204. In addition, a passive reflector 208 and a condenser lens 209 condensing light reflected from the passive reflector 208 on a keyboard 202 are provided near the fluorescent lamp 205.

Since a keyboard can be illuminated effectively even if the portable computer 100 disclosed in the above described Published Unexamined Japanese Patent Application No. 6-83479 or the portable computer 200 disclosed in the above described Published Unexamined Japanese Patent Application No. 8-76882 is used in the darkness of an airplane, there is hardly a possibility of troubling people around.

A portable computer such as a notebook PC receives the supply of power from external commercial AC power or a built-in battery. In a place, which has a commercial AC power, like an office, the portable computer receives the supply of power from the commercial AC power through an adapter. In a place without the commercial AC power, the portable computer receives the supply of power from the built-in battery. At the time of riding on a conveyance such as an airplane and using a portable computer, the portable computer will receive the supply of power from the built-in battery. However, with a present built-in battery, a portable computer cannot be used over a long time. For example, the power of a built-in battery will be consumed by the use in about 2 to 3 hours.

When a lamp 106 for illuminating the keys 102 is newly provided like the portable computer 100 disclosed in Published Unexamined Japanese Patent Application No. 6-83479, the power for turning on a lamp 106 is needed. In case the lamp 106 is turned on in an airplane, a built-in battery will be asked for the power. Therefore, the consumption of the built-in battery will become quick.

In the case of the portable computer 200 in Published Unexamined Japanese Patent Application No. 8-76882, a fluorescent lamp 205 that is a light source of a liquid crystal panel is asked for light illuminating the keyboard 202. That is, since the light source for illuminating the keys 102 is not newly provided like Published Unexamined Japanese Patent Application No. 6-83479, the problem that power dissipation increases does not arise. However, since the portable computer 200 disclosed in Published Unexamined Japanese Patent Application No. 8-76882 radiates light to the keyboard 202, additional elements, which are originally unnecessary for the liquid crystal panel 204, such as two passive reflectors 207 and 208, and a condenser lens 209 are needed. An additional element raises cost while complicating structure. In addition, since it is obliged to secure a space for arranging the additional element, it will be contrary to a common requirement, that is, miniaturization.

In view of the above situation, a subject of the present invention is to provide an image display apparatus that can illuminate input means such as a keyboard without adding a new element and moreover increasing power dissipation. Moreover, another subject of the present invention is to provide electronic equipment and a computer system each of which is equipped with such an image display apparatus.

SUMMARY OF INVENTION

A feature of the present invention relates to a display apparatus characterized in having a display panel for displaying an image, a light source for supplying light to the display panel, and a flat-surface lighting surface member which has a lighting surface emitting light, radiated from the light source, as flat-surface light while being arranged with the display panel. A housing contains the display panel, the light source, and the flat-surface lighting surface member. The housing further includes a window through light passes the flat-surface lighting surface member and leaks to the outside.

Another feature of the present invention provides a liquid crystal display apparatus that includes a liquid crystal display panel for displaying an image, a light source for emitting light for image display, and a light guide plate that has a front surface and a back surface. The liquid crystal display panel is arranged so that it is on the front surface side of the light guide and is used for leading light, emitted from the light source, to the liquid crystal display panel. A frame that holds the liquid crystal display panel, the light source, and the light guide plate has an optically transparent area that transmits light emitted from a back surface of the light guide plate.

Still yet another feature of the present invention provides an electronic equipment comprising an input operation unit, where operation keys are provided, and a display unit. The display unit comprises a display panel displaying an image by receiving the radiation of light, a light source for supplying the light, and an irradiating plate for radiating the light that is being emitted from the light source to the display panel, and illuminating the input operation unit by a part of the light radiated from the irradiating plate.

Furthermore, another feature of the present invention provides a computer system having an operation unit equipped with a keyboard as input means, a liquid crystal panel displaying an image, a backlight unit supplying light to the liquid crystal panel, and a frame that holds the liquid crystal panel in a front surface side and the backlight unit in a back surface side. The backlight unit includes a light source, a light guide plate that receives light emitted by the light source and emits flat-surface light from its own front surface side toward the liquid crystal panel, and a passive reflector which is arranged in a back surface side of the light guide plate and has translucency. A window that is formed in the back surface side of the frame leaks light being transmitted in the light guide plate and the passive reflector.

Therefore, another future of the present invention provides a computer system having an operation unit equipped with a keyboard as input means, a display panel displaying an image depending on contents of an operation of the operation unit, a light source emitting light for image display in the display panel and for illuminating the operation unit, and an optical distributor that receives light emitted from the light source, and distributes light for illuminating the operation unit, and for the image display.

Therefore, still another feature of the present invention provides a computer system having an operation unit equipped with a keyboard as input means, and a display unit equipped with a first surface displaying an image depending on contents of an operation in the operation unit and a second surface facing the first surface, and the light source supplying light for image display, wherein a part of light supplied from the light source is radiated toward the first surface, and another parts leak from the second surface to illuminate the operation unit.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIG. 1 is a perspective view showing a computer system according to this embodiment, and is a drawing showing a state of a liquid crystal display being close.

FIG. 2 is a perspective view showing the computer system according to this embodiment, and is a drawing showing a state of the liquid crystal display being open.

FIG. 3 is a perspective view showing the computer system according to this embodiment, and is a drawing showing a state of the liquid crystal display being open.

FIG. 4 is a perspective view showing the computer system according to this embodiment, and is a drawing showing a state of the liquid crystal display being open.

FIG. 5 is a perspective view showing the computer system according to this embodiment, and is a drawing showing a state that the liquid crystal display overlaps the keyboard.

FIG. 6 is a schematic cross section of the liquid crystal display.

FIG. 7 is a drawing showing a shutter used for the computer system according to this embodiment.

FIG. 8 is a view showing a back surface of the liquid crystal display of the computer system according to this embodiment.

FIGS. 9A and 9B are views explaining the open and close of the shutter of the computer system according to this embodiment.

FIG. 10 is a perspective view showing a front surface of the display according to this embodiment.

FIG. 11 is a perspective view showing a back surface of the display according to this embodiment.

FIG. 12 is a side view showing a known portable computer.

FIG. 13 is a perspective view showing a known portable computer.

DETAILED DESCRIPTION

The present inventor premises using a light source, which is provided for image display, as a light source for the illumination of a keyboard. It is because it must be surely avoided by using a new light source in order to suppress the increase of power consumption. How to lead the light, radiated from the light source for display, to candidates for irradiation such as a keyboard is a problem here without providing an additional constituent element.

The present inventor reviewed the routing of light in a liquid crystal display apparatus. Most light radiated from the fluorescent tube that is a light source for display advances into a light guide plate. The light advancing into the light guide plate is emitted toward an image display screen. That is, a surface facing the image display screen of the light guide plate emits light. However, it was conceived that, since an opposite surface (back surface) of the light guide plate also emitted light, this light could be used for the illumination of the keyboard etc.

A member called a passive reflector (or it is also called a diffusion plate) is arranged at the back surface side of the light guide plate. This passive reflector is provided in order to turn the light, advancing on the light guide plate, toward the image display screen side, and to make the inside of the light guide plate be in uniform brightness. However, since this member is not equipped with perfect lightproof, the light in the back surface side of the light guide plate passes and leaks from the passive reflector. In the present invention, using this leakage light for irradiation of a keyboard etc. is noted.

The display apparatus of the present invention has the window in the housing that configures a display apparatus. In addition, this window can make the light passing the flat-surface lighting surface member leak to the outside. For example, a keyboard can be illuminated by the leaked light. Here, since the light emitted from the light source that is originally used in the display apparatus is used as the light made to leak, it does not need to provide a new light source. This can illuminate the keyboard without increasing power consumption. Moreover, in the display apparatus of the present invention, the flat-surface lighting surface member is also a necessary member for radiating light to the display panel, and is not a member newly added. That is, the present invention can solve a subject with the very easy configuration of providing a window in a housing.

In the display apparatus of the present invention, a flat-surface lighting surface member has a back surface facing the above described lighting surface and the light passing the above described back surface can pass the above described window and can leak to the outside. Even if the back surface facing the above described lighting surface of the flat-surface lighting surface member emits light, it does not contribute to image display. Hence, for example, considering a conventional liquid crystal display apparatus, although the back surface of the light guide plate which is a flat-surface lighting surface member emits light, the light that is emitted from there has not been used. Here, in the case of a liquid crystal display apparatus, a passive reflector is provided in a back surface of a light guide plate, and the light incident into the light guide plate is reflected to the above described lighting surface by this passive reflector. However, this passive reflector is not necessarily lightproof. Therefore, the light that is emitted with the back surface of the light guide plate makes the passive reflector emit light, can pass the above described window, and can make this light emitted leak to the outside.

A window of the present invention can attain its main object by light penetration. Therefore, the window can be configured with a through-hole or optically transparent material. Nevertheless, in order to prevent penetration of dust into a housing, it is desirable to configure the window with the optically transparent material better than the through-hole. As the optically transparent material, a resin and others that are excellent in light transmittance can be used. In addition, what is necessary is just to determine a position in which the window is provided if needed.

In the display apparatus of the present invention, it is desirable to provide a light quantity regulator adjusting the quantity of the light that passes the above described window. It is because there is a case that the leakage of light is not acceptable or it is desired to adjust the quantity of leakage light according to a surrounding. Here, it also includes making the light quantity be zero to adjust the light quantity. As concrete examples of the light quantity regulator, there are means such as a shutter covering a window, or stacking a plurality of filters, which has light transmittance demanded and consists of material whose light transmittances differs from each other, on the window.

In the display apparatus of the present invention, the light leaking from the above described window can be used for the illumination of a keyboard. In that case, an installation position of the display apparatus or keyboard is adjusted so that the leaking light can be used for the illumination of the keyboard. In addition, although the leaking light can be also radiated directly at the object of illumination, it is also possible to radiate the leaking light to an object of illumination by making a reflector, for example, a mirror reflect the leaking light. That is, the display apparatus of the present invention can be equipped with a condensing member for condensing the light leaking from the above described window to a predetermined area.

In a liquid crystal display apparatus that radiates the light, emitted from a lamp, to a light guide plate, flat-surface light is emitted from the above described front surface of the light guide plate, and is radiated to the liquid crystal display panel. Although the back surface of the light guide plate also emits like the front surface, the passive reflector is arranged as mentioned above in this back surface side. The passive reflector plays the role of supplying the light, arriving at the back surface of the light guide plate, to the front surface side. As reflecting material in the passive reflector, although metal with a high reflection factor Aluminum or Gold was used at the beginning, Al or Ag has an excessively high reflection factor, and hence it caused a phenomenon of "glaring" display. Then, in order to prevent the "glaring", a plate, which white paint is applied to and consists of resin material etc., is used as the passive reflector. The passive reflector using this white paint transmits light. Light is made to leak to the outside by making the light emitted pass the optically transparent area that is provided in the frame.

In the liquid crystal display apparatus of the present invention, a shutter that can cover the optically transparent area mentioned above can be provided in the above described frame. With using the open and close operation of this shutter, it is possible to control the leakage of the light to the outside.

If the display apparatus described above is used, an operation unit of electronic equipment represented by a computer system can be illuminated without causing the increase of power consumption or complication of structure.

Electronic equipment of the present invention comprises a support arm for making it possible to move the display unit in front and back, and vertical directions to the input operation unit, and to support the display unit in arbitrary positions, wherein, when the display unit is supported in a predetermined position by the support arm, the input operation unit is illuminated by a part of light emitted from the irradiating plate. When it is unnecessary to illuminate the input operation unit, it is possible to make the light, emitted from the irradiating plate, be radiated to areas other than the input operation unit by operating the support arm.

It is not desirable for the illumination of the light illuminating the input operation unit to be too strong. Therefore, it is desirable that, in the electronic equipment of the present invention, the above described irradiating plate reduces the illumination of the light emitted from the above described light source, and the light whose illumination is reduced by the above described irradiating plate is used for the illumination of the above described input operation unit. For example, a light guide plate of a liquid crystal display apparatus emits light whose illumination is reduced rather than the light emitted from a lamp that is a light source. Moreover, a passive reflector arranged at a back surface of the light guide plate emits light whose illumination is further reduced. On the other hand, the illumination of the lamp used for the liquid crystal display apparatus is very strong, and it may not be adequate to use this light for direct lighting. The present invention can remove an abuse of "being too bright" by using for the illumination of an input operation unit with the light whose illumination is reduced by passing a light guide plate and also a passive reflector like the liquid crystal display apparatus.

In the present invention, it is necessary that the above described liquid crystal display unit is attached to the operation unit so that light leaking from the window can illuminate the operation unit. This can be easily realized by adopting link mechanisms, each of which has two or more revolving shafts, for the above described liquid crystal display unit and the above described operation unit as described in an embodiment described later.

The computer system of the present invention comprises a battery as a driving source, and can make a light source of a backlight unit emit light with this battery. Here, while the light emitted from this light source irradiates the liquid crystal panel, it leaks to the outside from the window of the frame, and the light which has passed through the light guide plate and the passive reflector can illuminate the operation unit. That is, since the light source for the illumination of the operation unit is not newly added, consumption of the battery can be suppressed.

It can be said that the above described light guide plate has a function dividing the light, emitted from the light source, into light for the irradiation of the liquid crystal panel and light for the illumination of the operation unit.

In the computer system of the present invention, the optical distributor consists of a plate having two surfaces facing each other while consisting of optically transparent material, and it is possible to have a form of emitting light, illuminating the operation unit, from one surface out of the two surfaces, and emitting light illuminating the operation unit from another surface out of the two surfaces is emitted.

In the computer system described above, a part of light emitted from the light source contributes to image display by being supplied to the image display screen, and other parts contribute to the illumination of the operation unit by leaking from a surface facing the image display screen.

The computer system of the present invention can comprise a window where light leaks to the second surface, and a sliding shutter which can cover this window. Since the sliding shutter can open and close the window in a narrow space, it is effective for a thin image display apparatus such as a liquid crystal display apparatus.

Hereinafter, an embodiment of the present invention will be described with referring to drawings.

FIGS. 1 and 2 show a computer system 1 according to this embodiment. As shown in FIGS. 1 and 2, the computer system 1 consists of an operation unit 2 and a liquid crystal display 4. The operation unit 2 and liquid crystal display 4 are connected with an arm 9. As for the arm 9, one end is rotatably attached to the operation unit 2, and another end is rotatably attached to the liquid crystal display 4. Therefore, the liquid crystal display 4 is movable back and forth, and vertically to the operation unit 2. Moreover, the arm 9, operation unit 2, and liquid crystal display 4 are attached with a strength enough to maintain the liquid crystal display 4 in arbitrary positions.

A keyboard 3 is provided in the operation unit 2 as input operation means. Letters, symbols, etc. are inputted by operating this keyboard 3, and also various operation of the computer system 1 is controlled. Moreover, a built-in battery not shown is arranged in the operation unit 2, and the computer system 1 can be driven with this built-in battery.

The liquid crystal display 4 is equipped with the liquid crystal display panel 5 for displaying an image and the frame 6, containing the liquid crystal display panel 5, as a housing. The liquid crystal display panel 5 displays an image according to the operation in the operation unit 2. Here, in the liquid crystal display 4, a side where the liquid crystal display panel 5 is provided may be called a front surface and a side facing the front surface may be called a back surface. Three windows 7 are provided in the back surface of the frame 6. The windows 7 form through-holes in the back surface of the frame 6, and has the structure of encapsulating the through-holes with transparent resin material. As described below, light leaks to the outside from these windows 7. Therefore, the windows 7 configure optically transparent areas in the frame 6.

As mentioned above, the liquid crystal display 4 of the computer system 1 can be moved up and down, and back and forth to the operation unit 2, and the computer system 1 can be used in a state of maintaining the liquid crystal display 4 in the positions as shown in FIGS. 3 and 4. However, the position of this liquid crystal display 4 is a typically standard position, and the position of the liquid crystal display 4 may be changed by the posture of a user of the computer system 1. For example, when using the computer system 1 at a seat of an airplane, since a user cannot fully secure a distance from the liquid crystal display 4, it may be difficult for the user to look at the liquid crystal display 4 in the position as shown in FIGS. 3 and 4. In such a case, what is necessary is just to make the liquid crystal display 4 into a condition approximately parallel to the operation unit 2, as shown in FIG. 5. When the computer system 1 is seen from the upper part at this time, the liquid crystal display 4 and operation unit 2 will overlap, and a part of the keyboard 3 will be hidden by the liquid crystal display 4. If circumference is dark, it will become inconvenient to operate the keyboard 3, and in particular, this hidden portion. In such a case, the computer system 1 according to this embodiment can illuminate the keyboard 3 as described below.

FIG. 6 shows a schematic cross section of the liquid crystal display 4. As shown in FIG. 6, the liquid crystal display 4 has the structure that the liquid crystal display panel 5, light guide plate 10, and passive reflector 11 are stacked from the front surface side. The light guide plate 10 consists of a resin, which is excellent in the light transmittance, such as polymethylmethacrylate. Moreover, the passive reflector 11 is configured with a thin plate made of a resin where white paint is applied. Although the white paint becomes the material for reflecting light, it is not a perfect lightproof material, that is, the passive reflector 11 has translucency.

A fluorescent tube 12 is arranged as a light source in one end of the light guide plate 10. The fluorescent tube 12, the light guide plate 10, and the passive reflector 11 configure a backlight unit. Here, light emitted from the fluorescent tube 12 enters from one end of the light guide plate 10, and advances the inside of the light guide plate 10, repeating reflection on the front surface and back surface of the light guide plate 10. Since the passive reflector 11 is arranged in the back surface of the light guide plate 10, most light which advances the inside of the light guide plate 10 is emitted and radiated from the front surface toward the liquid crystal display panel 5. Since the light guide plate 10 is a rectangle, the light emitted on the front surface turns into flat-surface light. Therefore, the light guide plate 10 functions as a flat-surface lighting surface member. Since the back surface of the light guide plate 10 emits light similarly and the passive reflector 11 has the translucency as mentioned above, the back surface of the passive reflector 11 also emits light.

The light emitted by the passive reflector 11 is radiated between the passive reflector 11 and the frame 6, and its part leaks to the outside from the windows 7 formed in the frame 6. The leaked light illuminates the circumference. In particular, when the liquid crystal display 4 covers the keyboard 3 as shown in FIG. 5, the light leaked from the windows 7 illuminates the keyboard 3. Therefore, when using the computer system 1 in darkness, for example, an airplane that is performing the night flight, the keyboard 3 can be illuminated without causing surrounding people trouble.

The light illuminating the keyboard 3 is a part of the light emitted from the fluorescent tube 12 for irradiating the liquid crystal display panel 5 through the light guide plate 10. Therefore, since a new light source is not added for illuminating the keyboard 3, this suggests that the keyboard 3 can be illuminated without causing the increase of power consumption. On the other hand, in a liquid crystal display apparatus well known from the past, the light emitted from the fluorescent tube 12 has been used only for irradiating the liquid crystal display panel 5. Hence, the light emitted from the passive reflector 11 has been mainly radiated to the frame 6 and its effective utilization has not been performed. That is, the computer system 1 according to this embodiment makes it possible to use the light, which has not been used conventionally, for the illumination of the keyboard 3 by adopting the very simple configuration of providing the windows 7 in the frame 6.

Moreover, the light illuminating the keyboard 3 transmits the light guide plate 10 and passive reflector 11. Therefore, the illumination of the light illuminating the keyboard 3 is reduced rather than the light emitted from the fluorescent tube 12. Generally, the illumination of the fluorescent tube 12 is set to be very high, in order to have a good screen display. When the keyboard 3 is illuminated with this illumination being maintained, there is the anxiety of being too bright. However, since the illumination of the computer system 1 is reduced by the light guide plate 10 and passive reflector 11, there is hardly a possibility of being too bright.

Furthermore, the computer system 1 according to this embodiment also has another advantage that the light illuminating the keyboard 3 does not pass through the front of the liquid crystal display panel 5. That is, there is a possibility of badly having a bad affecting the quality of an image displayed when the light illuminating the keyboard 3 passes through the front of the liquid crystal display panel 5. Nevertheless, since being radiated from the back surface of the liquid crystal display panel 5 in the computer system 1 according to this embodiment, the light illuminating the keyboard 3 never pass through the front of the liquid crystal display panel 5.

Although the above computer system 1 is made to have the structure of encapsulating the through-holes, which are formed as the windows 7 in the frame 6 with the transparent resin material, the present invention is not limited to this form. It is possible that the through-holes as they are can also demonstrate the function as the windows 7 according to the present invention that makes the light, which is emitted from the passive reflector 11, leak. Nevertheless, encapsulation with the transparent resin material is a desirable form, since it is possible to prevent the deterioration in the frame 6. Moreover, since the encapsulation material just has to make light leak, the material can be translucent. Furthermore, although light leaks from the windows 7 as long as the liquid crystal display 4 is being used in the computer system 1, it is possible to prevent the leakage of the light to the outside by covering the windows 7 according to a user's selection. Hereafter, an embodiment where the leakage of light to the outside is prevented with a sliding shutter will be described with using drawings.

FIG. 7 is a drawing showing a sliding shutter 13 and FIG. 8 is a drawing showing the frame 6 suitable for providing the shutter 13.

The shutter 13 is formed from a thin resin strip, which screens light, such as a strip which is painted in black, and the through-holes 14 whose shapes and areas are the same as those of the windows 7 in the frame 6 are formed. Moreover, projections 15 for slide are formed at two places in the shutter 13.

Openings 16 for slide for making the projections 15 for slide are formed in the frame 6.

FIGS. 9A and 9B are drawings showing the back surface side of the liquid crystal display 4, FIG. 9A shows a state of opening the shutter 13, and FIG. 9B shows a state of closing the shutter 13.

The shutter 13 is set inside the back surface of the frame 6 so that the projections 15 for slide may enter into the openings 16 for slide in the frame 6. As shown in FIG. 9A, the projections 15 for slide is moved near by the left end sides of the openings 16 for slide, when it is desired that light leaks from the windows 7 in the frame 6. Then, when the positions of the through-holes 14 in the shutter 13 and the windows 7 in the frame 6 coincide with each other, the windows 7 become open. On the other hand, the projections 15 for slide are moved near by the right end sides of the openings 16 for slide, when it is desired that the leakage of the light from the windows 7 can be prevented. Then, since the windows 7 and portions other than through-holes 14 in the shutter 13 overlap, the windows 7 become close. That is, the leakage of the light to the outside can be prevented.

Here, an example of moving the projections 15 for slide near by the left ends or right ends of the openings 16 for slide is shown. Nevertheless, the projections 15 for slide can be also stopped at arbitrary positions between the left ends and right ends of the openings 16 for slide. This is in a state that the windows 7 are open, for example, by ½ or ⅓, and this means adjusting an amount of the light passing the windows 7. Therefore, the shutter 13 has a function as a light quantity regulator adjusting the amount of the light passing the windows 7. The shutter 13 shown in FIG. 7 to FIG. 9B adjusts the amount of the light, passing the windows 7, with the areas given by overlapping with each of the windows 7. However, the amount of light can be also adjusted by configuring the shutter 13 so that respective window 7 may be closed independently. Moreover, it is also possible to open and close independently the shutter 13, having light transmittances different from each other, to three windows 7.

Although the embodiment described above is described the example of the present invention being applied to the computer system 1, the present invention is also realizable as a stand-alone image display apparatus. Hereafter, its concrete example will be described on the basis of drawings.

FIGS. 10 and 11 are drawings showing examples of the present invention being applied to a liquid crystal display apparatus 20.

As shown in FIGS. 10 and 11, the liquid crystal display apparatus 20 consists of a display body 21, and a display stand 26. The display body 21 is attached with being adjustable at an angle to the display stand 26 with known means.

The display body 21 is equipped with a liquid crystal display panel 23 and a frame 24 containing the liquid crystal display panel 23 and the like. In addition, the display body 21 also has a backlight unit similar to that in the first embodiment, and each component configuring the backlight unit is arranged in each predetermined position in the frame 24. Windows 25 are formed in the back surface of the frame 24 as shown in FIG. 11. What is adopted as the configuration of the windows 25 is the configuration of encapsulating through-holes, formed in the back surface of the frame 24 like the first embodiment, with transparent resin material. Therefore, a part of light emitted from a fluorescent tube configuring the backlight unit leaks to the outside from the windows 25.

The display stand 26 consists of a pedestal 27 and a column 28 standing from the pedestal 27. The liquid crystal display panel 23 is attached to the upper end of the column 28. A reflecting mirror 29 is provided in the column 28.

The light leaking from the windows 25 is radiated at the back surface side of the liquid crystal display panel 23. Therefore, if it remains as it is, the light leaked from the windows 25 does not turn into light illuminating the front surface side of the liquid crystal display panel 23. However, in the liquid crystal display apparatus 20 according to this embodiment, the reflecting mirror 29 is provided in the column 28. Hence, as shown in FIG. 10, a part of the light leaking from the windows 25 is radiated to this reflecting mirror 29. The light radiated to the reflecting mirror 29 turns into the light that is reflected by the reflecting mirror 29 and illuminates the front surface side of the liquid crystal display panel 23. That is, since the light leaking from the windows 25 is condensed to a predetermined area that is the front surface side of the liquid crystal display panel 23, the reflecting mirror 29 functions as a condensing member for it.

When the liquid crystal display apparatus 20 is used as an image display apparatus of a computer system, a keyboard is arranged in front of the liquid crystal display apparatus 20. Therefore, the light reflected by the reflecting mirror 29 turns into light illuminating the keyboard. Moreover, if the reflecting mirror 29 is attached to the column 28 so that an angle of the reflecting mirror 29 can be changed, that is, so that a reflective direction of light can be changed, not only the keyboard but also a draft and the like for an input that are placed around the keyboard can be illuminated.

In the above embodiments, the examples in each of which the present invention is applied to a computer system are described. However, objects for the application of the present invention are not limited to computer systems. The present invention is universally applicable to electronic equipment that has an input operation unit like a keyboard, and is equipped with a light source for image display. Moreover, although the liquid crystal display is described as each example as means for image display, this does not also become a base for limiting the present invention. It goes without saying that the present invention is applicable to what is equipped with a light source for image display.

As described above, according to the present invention, it is possible to obtain an image display apparatus that can illuminate input means such as a keyboard without adding a new element and increasing power consumption.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. A display apparatus comprising:
    a display panel for displaying an image;
    a light source for supplying light to the display panel;
    a flat-surface lighting surface member which has a lighting surface emitting light, radiated from the light source, as a flat-surface light while being arranged with the display panel; and
    a housing that contains the display panel, the light source, and the lighting surface member, and has at least one window disposed parallel to the display surface through which light from the lighting surface member leaks to the outside.

2. The display apparatus according to claim 1, wherein the lighting surface member has a back surface facing the lighting surface, and wherein light passing through the back surface passes the window to leak to the outside.

3. The display apparatus according to claim 1, wherein the window comprises a through-hole or optically transparent material.

4. The display apparatus according to claim 1, wherein a light quantity regulator adjusting the quantity of light passing the window.

5. The display apparatus according to claim 1, wherein a condensing member for condensing light leaking from the window in a predetermined area is provided.

6. A liquid crystal display apparatus, comprising:
    a liquid crystal display panel for displaying an image;
    a light source for emitting light for image display;
    a light guide plate that has a front surface and a back surface, the liquid crystal display panel being arranged on the front surface side of said light guide, and being used for leading light emitted from the light source to the liquid crystal display panel; and
    a frame that holds the liquid crystal display panel, the light source, and the light guide plate, and has an optically transparent area parallel to the display panel that transmits light emitted from a back surface of the light guide plate.

7. The liquid crystal display apparatus according to claim 6, wherein a shutter that can cover the optically transparent area is provided in the frame.

* * * * *